United States Patent
Venkatachari et al.

(10) Patent No.: US 9,148,832 B2
(45) Date of Patent: Sep. 29, 2015

(54) REDUCING OUT-OF-SERVICE AND EXTENDING EFFECTIVE CELL COVERAGE WITH RECEIVER DIVERSITY

(71) Applicant: QUALCOMM Incorporated, San Diego, CA (US)

(72) Inventors: Harish Venkatachari, Sunnyvale, CA (US); Vansh Pal Singh Makh, San Francisco, CA (US); Nate Chizgi, Sunnyvale, CA (US); Sharif Ahsanul Matin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 14/057,950

(22) Filed: Oct. 18, 2013

(65) Prior Publication Data

US 2014/0228026 A1    Aug. 14, 2014

Related U.S. Application Data

(60) Provisional application No. 61/763,844, filed on Feb. 12, 2013.

(51) Int. Cl.
| | |
|---|---|
| H04W 36/00 | (2009.01) |
| H04B 7/02 | (2006.01) |
| H04B 17/26 | (2015.01) |
| H04B 17/318 | (2015.01) |
| H04B 17/327 | (2015.01) |
| H04B 7/08 | (2006.01) |
| H04L 5/00 | (2006.01) |

(52) U.S. Cl.
CPC ........... *H04W 36/0083* (2013.01); *H04B 7/022* (2013.01); *H04B 7/0871* (2013.01); *H04B 17/26* (2015.01); *H04B 17/318* (2015.01); *H04B 17/327* (2015.01); *H04B 7/0837* (2013.01); *H04B 7/0877* (2013.01); *H04L 5/0035* (2013.01)

(58) Field of Classification Search
USPC ......................... 455/435.1, 436–439; 370/331
See application file for complete search history.

(56) References Cited

U.S. PATENT DOCUMENTS

| | | |
|---|---|---|
| 2005/0197080 A1 | 9/2005 | Ulupinar et al. |
| 2008/0259893 A1 | 10/2008 | Murata et al. |
| 2010/0165860 A1 | 7/2010 | Wigren |
| 2012/0149424 A1 | 6/2012 | Dawid et al. |
| 2013/0017797 A1 | 1/2013 | Ramasamy et al. |
| 2013/0102316 A1 | 4/2013 | Ngai et al. |

OTHER PUBLICATIONS

International Search Report and Written Opinion—PCT/US2014/010602—ISA/EPO—Mar. 21, 2014.

(Continued)

*Primary Examiner* — Sam Bhattacharya
(74) *Attorney, Agent, or Firm* — Loza & Loza LLP

(57) ABSTRACT

A method, an apparatus, and a computer program product for wireless communication are provided. The apparatus may obtain a measurement of a radio condition from a radio frequency signal received at a first antenna and enable receive diversity for further measurements of the radio condition when a metric of the radio condition does not meet a predefined threshold value. A probability of occurrence of an out-of-service state may be reduced by measuring the radio condition using further measurements using receiver diversity. The further measurements of the radio condition may be based on whether one version of the signal has greater energy than the other versions of the signal. The further measurements of the radio condition may obtained by combining received versions of the signal utilizing combination diversity to obtain a combined signal strength/energy.

22 Claims, 5 Drawing Sheets

(56) References Cited

OTHER PUBLICATIONS

Hutchison : "Evidence of Ping-Ponging on UMTS Network", 3GPP Draft; R2-063188, 3rd Generation Partnership Project (3GPP), Mobile Competence Centre ; 650, Route Des Lucioles; F-06921 Sophia Antipolis Cedex ; France, vol. CTWG1, No. Vancouver, Canada; 20070129, Jan. 29, 2007, XP050024876, [retrieved on Jan. 29, 2007].

Written Opinion of the International Preliminary Examining Authority—PCT/US2014/010602—ISA/EPO—Feb. 12, 2015.

REDUCING OUT-OF-SERVICE AND EXTENDING EFFECTIVE CELL COVERAGE WITH RECEIVER DIVERSITY

CROSS REFERENCE TO RELATED APPLICATIONS

This application claims priority to and benefit under 35 U.S.C. §119(e) to U.S. Provisional Patent Application No. 61/763,844, titled "Reducing Out-Of-Service and Extending Effective Cell Coverage with Receiver Diversity" and filed on Feb. 12, 2013, hereby incorporated by reference in its entirety as if fully set forth below and for all applicable purposes.

BACKGROUND

1. Technical Field

The present disclosure relates generally to communication systems, and more particularly, to network reselection involving wireless terminals.

2. Background

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power).

In a wireless communication system, the mobile device (referred to in various standards as a user equipment (UE), an access terminal (AT), etc.) may employ a connected mode or traffic mode, where a data call or voice call is ongoing, and an idle mode, where the UE performs a variety of functions such as a cell search, acquisition, and establishment of channels for radio communication. Usually, incoming page messages, which generally indicate that a call is incoming for the UE, are received and decoded while the UE is in the idle mode.

Many modern UEs may include two or more antennas, with two or more corresponding radio frequency (RF) transceiver chains. Depending on the operations mode, these two antennas may be utilized in coordination to enable what is called spatial diversity (where the same signal is received or transmitted via two spatially separated antennas), or in other examples, they may be utilized separately communicate with different channels, different base stations, or even different radio access networks (RAN). With such a multi-antenna UE, in a simple example, wireless signals may be received by each antenna, and the UE may be configured to process and/or coherently combine these spatially diverse signals.

In conventional systems, a UE may detect and measure one or more reference signals received from one or more base stations, and may report information corresponding to those measurements back to the network. Based on these measurements, if the received signal strength and/or quality is poor, the UE may determine that it is out of service (OOS), and may initiate a frequency rescan and/or may initiate a reselection process that causes the UE to acquire a connection with a different base station.

When a UE is in motion, and traveling in a direction away from its serving base station, it may eventually leave its serving base station's coverage area. In addition, temporary degradation of cell measurements may be caused by islands of interference, coverage holes and/or local interference at the UE.

As the demand for mobile broadband access continues to increase, research and development continue to advance wireless technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method of wireless communication operable at a user equipment (UE). Here, the method may include obtaining a first measurement of a radio channel corresponding to a current serving cell, by utilizing a first antenna, and enabling receive diversity utilizing the first antenna and a second antenna to obtain a second measurement of the radio channel when a metric of the radio channel corresponding to the first measurement is less than a predetermined threshold value, wherein enabling receive diversity reduces a probability of occurrence of an out-of-service state based on the second measurement.

In another aspect, the disclosure provides a UE configured for wireless communication, including means for obtaining a first measurement of a radio channel corresponding to a current serving cell, by utilizing a first antenna, and means for enabling receive diversity utilizing the first antenna and a second antenna to obtain a second measurement of the radio channel when a metric of the radio channel corresponding to the first measurement is less than a predetermined threshold value. Here, the means for enabling receive diversity is configured to reduce a probability of occurrence of an out-of-service state based on the second measurement.

In another aspect, the disclosure provides a UE configured for wireless communication, including at least one processor, a memory coupled to the at least one processor, a first antenna and a second antenna, and at least one transceiver coupled to the first antenna and the second antenna, and coupled to the at least one processor. Here, wherein the at least one processor is configured to obtain a first measurement of a radio channel corresponding to a current serving cell, by utilizing the first antenna, and to enable receive diversity utilizing the first antenna and the second antenna to obtain a second measurement of the radio channel when a metric of the radio channel corresponding to the first measurement is less than a predetermined threshold value, wherein enabling receive diversity reduces a probability of occurrence of an out-of-service state based on the second measurement.

In another aspect, the disclosure provides a computer-readable storage medium having instructions that, when executed by a computer, cause the computer to obtain a first measurement of a radio channel corresponding to a current serving cell, by utilizing the first antenna, and to enable receive diversity utilizing the first antenna and the second antenna to obtain a second measurement of the radio channel when a metric of the radio channel corresponding to the first measurement is less than a predetermined threshold value. Here, enabling receive diversity reduces a probability of occurrence of an out-of-service state based on the second measurement.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
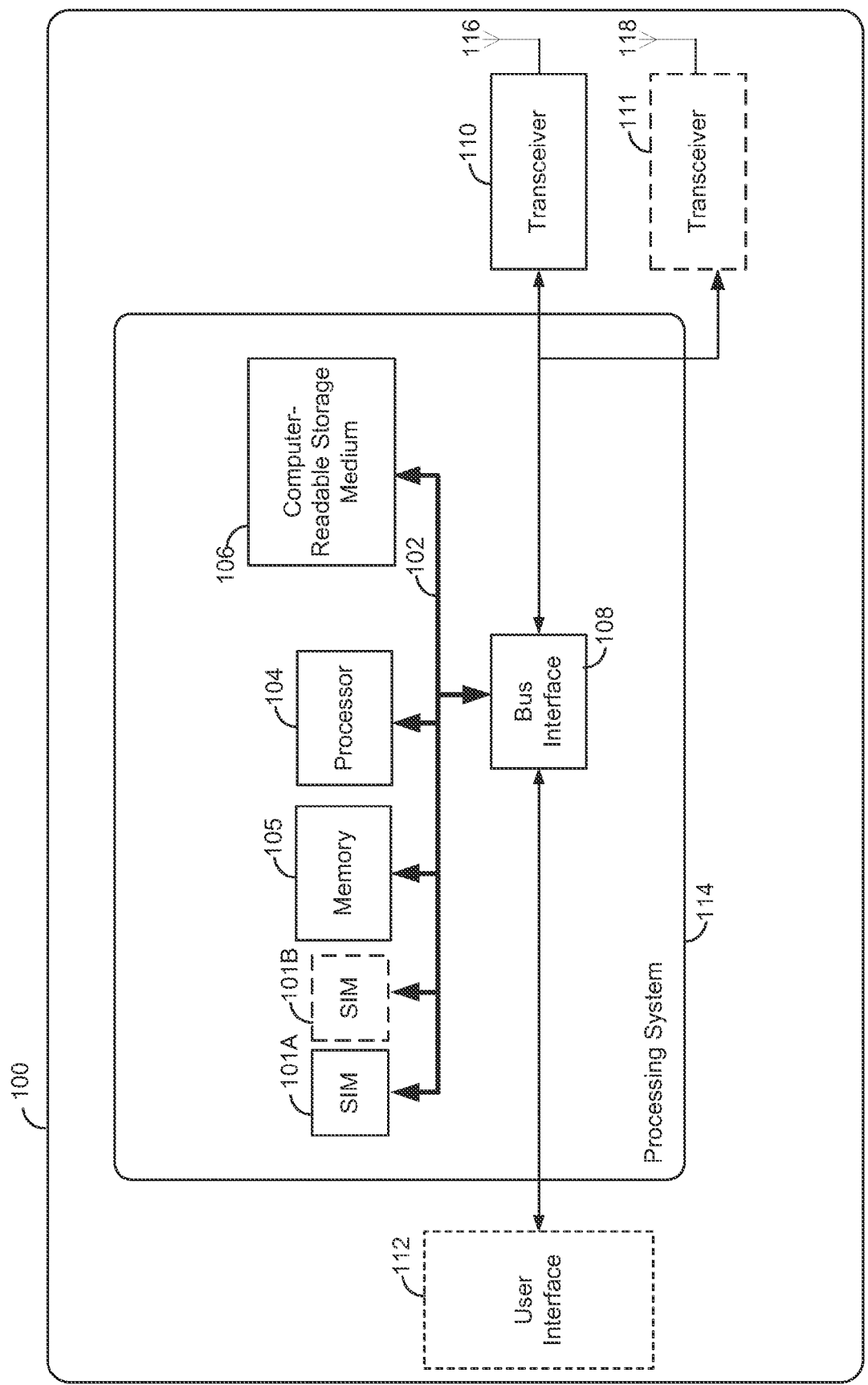
FIG. 1 is a diagram illustrating a user equipment (UE) employing at least one processor in accordance with one example.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In some scenarios, for example resulting from low signal strength and/or poor signal quality, user equipment (UE) traveling through a wireless access network may be susceptible to frequent reselections at or near cell edges. Isolated or transitory instances of inadequate signal strength or quality may lead to an unnecessary declaration of out of service status corresponding to the current serving cell, and initiation of frequency rescans when the mobile device is located at or near the edge of a cell.

Frequency rescans can be power- and time-consuming. Moreover, in some cases, premature frequency rescans and reselections may cause the UE to reselect to networks that do not provide the services required or desired by the UE's user or their service provider. That is, in some cases, the target base station to which the UE may reselect belongs to a different radio access network (RAN) than that of the serving base station, and the UE, its user, and/or the service provider may prefer the services provided through its current serving base station. (For example, its current serving base station may be configured for a high-speed 3G network, while the target base station might be configured for a slower 2G network.)

The UE may prefer to maintain its connection with its serving base station for as long as possible, to preserve power and maintain services better suited to the UE. However, delaying declaration of out-of-service status may create other issues when paging decode performance is degraded. Accordingly, there is a need in the art for a way to reduce occurrences of the mobile device entering an out-of-service state while maintaining page decoding performance.

Therefore, one or more aspects of the present disclosure provide a UE capable of reducing the probability of occurrence of the OOS state, and accordingly maintaining communication with its current serving cell rather than declaring the OOS state and initiating frequency rescans and reselections. To this end, the UE may enable receive diversity utilizing a plurality of antennas to measure characteristics of the radio channel in response to the determination that other measurements, performed utilizing a single antenna, indicate that one or more characteristics of the radio channel are poor. By utilizing receive diversity in this way, gains in the receive signal quality may be achieved, effectively increasing the service area of the serving base station.

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. For example, the apparatus 100 may be a user equipment (UE) as illustrated in any one or more of FIGS. 2, 3, and/or 5. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 104, as utilized in an apparatus 100, may be used to implement any one or more of the processes described below and illustrated in FIGS. 3 and/or 4.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, computer-readable media (represented generally by the computer-readable storage medium 106), and one or more subscriber identity modules (SIM) 101. The bus 102 may also link various other circuits such as timing sources, peripherals, voltage regulators, and power management circuits, which are well known in the art, and therefore, will not be described any further. A bus interface 108 provides an interface between the bus 102 and one or more transceivers 110 and/or 111. The transceivers 110 and 111 provide means for communicating with various other apparatus over a transmission medium. Depending upon the nature of the apparatus, a user interface 112 (e.g., keypad, display, speaker, microphone, joystick) may also be provided.

In some aspects of the disclosure, the illustrated UE 100 may include two SIMs 101A and 101B, wherein each SIM may utilize a corresponding transceiver 110 or 111, and an antenna 116 or 118, for communication with a corresponding network. However, in various aspects of the disclosure, the UE 100 may be configured to selectively assign both transceivers 110 and 111, and antennas 116 and 118 to the same SIM such that the SIM may access multiple carriers of the same network concurrently or simultaneously so as to perform the below-described time and frequency tracking algorithm.

The processor 104 is responsible for managing the bus 102 and general processing, including the execution of software stored on the computer-readable medium 106. The software, when executed by the processor 104, causes the processing system 114 to perform the various functions described below for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
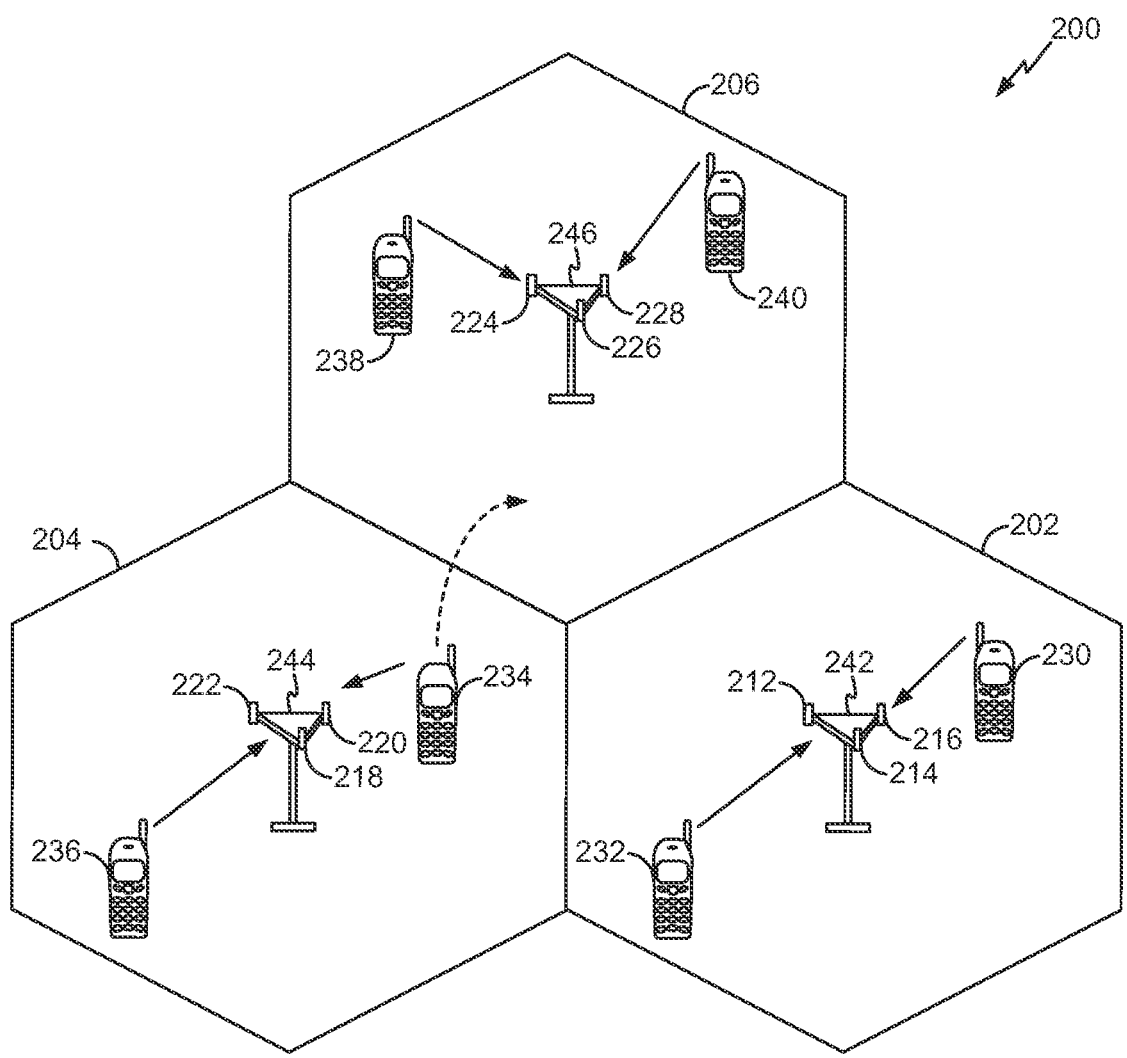
FIG. 2 is a simplified schematic diagram illustrating one example of a radio access network (RAN) including a plurality of cells and base stations.

In some aspects of the disclosure, the UE 100 may be configured for operation in one or more radio access network (RAN) configurations. As one nonlimiting example of a RAN, provided merely for clarity, one example of a RAN configured according to universal mobile telecommunication (UMTS) standards, called a UMTS Terrestrial Radio Access Network (UTRAN) is shown. That is, the UTRAN is one example of a RAN that may be utilized in accordance with the present disclosure. Referring to FIG. 2, by way of example and without limitation, a simplified schematic illustration of a RAN 200 in a UTRAN architecture is illustrated. The system includes multiple cellular regions (cells), including cells 202, 204, and 206, each of which may include one or more sectors. Cells may be defined geographically (e.g., by coverage area) and/or may be defined in accordance with a frequency, scrambling code, etc. That is, the illustrated geographically-defined cells 202, 204, and 206 may each be further divided into a plurality of cells, e.g., by utilizing different scrambling codes. For example, cell 204a may utilize a first scrambling code, and cell 204b, while in the same geographic region and served by the same Node B 244, may be distinguished by utilizing a second scrambling code.

In a cell that is divided into sectors, the multiple sectors within a cell can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 may each correspond to a different sector. In cell 206, antenna groups 224, 226, and 228 may each correspond to a different sector.

The cells 202, 204, and 206 may include several UEs that may be in communication with one or more sectors of each cell 202, 204, or 206. For example, UEs 230 and 232 may be in communication with Node B 242, UEs 234 and 236 may be in communication with Node B 244, and UEs 238 and 240 may be in communication with Node B 246. Here, each Node B 242, 244, and 246 may be configured to provide an access point to a core network 204 (see FIG. 2) for all the UEs 230, 232, 234, 236, 238, and 240 in the respective cells 202, 204, and 206.

During a call with a source cell, or at any other time, the UE 236 may monitor various parameters of the source cell as well as various parameters of neighboring cells. Further, depending on the quality of these parameters, the UE 236 may maintain communication with one or more of the neighboring cells. During this time, the UE 236 may maintain an Active Set, that is, a list of cells to which the UE 236 is simultaneously connected (i.e., the UTRAN cells that are currently assigning a downlink dedicated physical channel DPCH or fractional downlink dedicated physical channel F-DPCH to the UE 236 may constitute the Active Set).

Of course, the UTRAN 200 may operate at the same geographic area, or a nearby area, to another RAN, which may be another UTRAN (e.g., managed by another service provider), or may be a RAN utilizing a different technology. When a UE such as the UE 100, which has multiple antennas and/or multiple transceivers, as the UE 100 moves about the RAN, suitable mobility procedures may be utilized to ensure that the UE 100 maintains communication with the best RAN at any given time.

Figure 3:
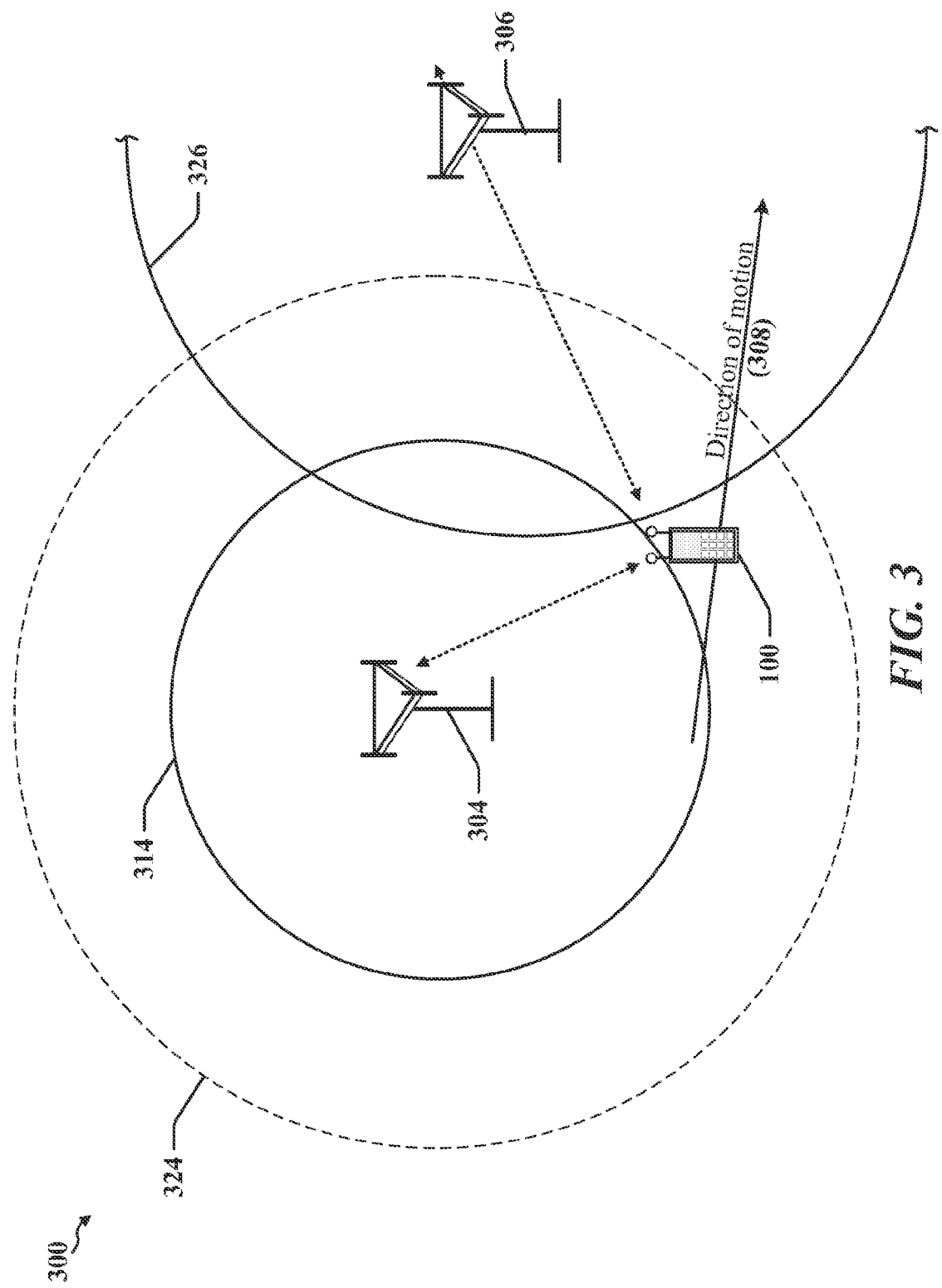
FIG. 3 is a diagram illustrating a UE traversing a cell in a wireless network.

For example, FIG. 3 illustrates a UE 100 in communication with a current serving base station 304. In some examples, the current serving base station 304 may be operational in a UTRAN 200. However, this is not necessarily the case. By way of example, the RANs corresponding to either of the base stations 304 and 306 in FIG. 3 may be operated by the same or different network operators, and may include one or more of a Universal Terrestrial Radio Access Network (UTRAN), a Global System for Mobile Communications (GSM) EDGE Radio Access Network (GERAN), a Long Term Evolution (LTE) evolved UTRAN (E-UTRAN), an IEEE 802.11 (Wi-Fi) network, an IEEE 802.16 (WiMAX) network, an IEEE 802.20 network, or a Flash-OFDM network. RANs may also be one or more of Evolution-Data Optimized (EV-DO) or Ultra Mobile Broadband (UMB) networks, or any other suitable communication technology.

As illustrated, the UE 100 may be moving in a direction of motion 308, which may be generally away from its current serving base station 304. Further, the direction of motion 308 may move the UE 100 generally towards a service area 326 corresponding to a second base station 306. Here, the current serving base station 304 and the second base station 306 may be operating in the same or different radio access networks (RANs).

The UE 100 may communicate with one or more of the base stations 304 and 306. Base stations 304, 306 may include, or may be referred to, as access points, base transceiver stations, radio access points, access stations, radio transceivers, basic service sets, extended service sets, a Node B, an evolved Node B, or some other suitable terminology. Base stations 304, 306 may provide services from the same RAN or from different RANs.

In one example, the UE 100 may obtain services from a first RAN through a first base station 304 and services from a second RAN through a second base station 306. In another example, the UE 100 may obtain services from a single RAN through the first base station 304 and the second base station 306 operated by a single network operator. Both base stations 304 and 306 may operate using a common radio access technology (RAT). The UE 100 may communicate with a single RAN using one or more transceivers 110 and/or 111, and their corresponding antennas 114 and 116.

At any suitable time, the UE 100 may detect and measure one or more characteristics of a radio channel corresponding to its current serving base station 304, received by antenna 114 or 116, and may report characteristics such as a received signal code power (RSCP), a received signal quality, etc. Based on these measurements, the UE 100 may determine that the received signal strength and/or quality is below a suitable value, and that better service may be available from a different base station and/or RAN. Accordingly, the UE 100 may determine that it is out of service (OOS), and may initiate a frequency rescan and/or may initiate a reselection that causes the UE 100 to acquire a connection with a second RAN, e.g., corresponding to the second base station 306. For the purposes of this description, it will be assumed that the second base station 306 belongs to a different RAN than the current serving base station 304, although this not necessarily the case. Furthermore, for the purposes of this description, it will be assumed that the RAN corresponding to the second base station 306 provides one or more different levels of service than the RAN corresponding to the current serving base station 304, and/or corresponds to a different service provider than that of the current serving cell base station 304.

For example, as the UE 100 continues to move in the direction of motion 308, it may eventually cause the UE 100 to leave the coverage area of the base station 304. For example, a strong coverage area 314 may extend a certain distance from the serving base station 304, and if the UE 100 is at or near the edge of this cell, conventional algorithms may lead to frequency rescans and/or reselections to neighboring base stations and/or RANs. However, temporary or transient degradation of cell measurements may be caused by islands of interference, coverage holes and/or local interference at the UE 100.

Moreover, in some aspects of the disclosure, the UE 100 may be configured to prefer to stay in the service of its current serving base station 304. Still further, in some aspects of the disclosure, it may be desirable for the UE 100 to refrain from performing battery-intensive operations such as frequency rescans. In such cases, according to one or more aspects of the present disclosure, the UE 100 may be configured to perform operations to attempt to maintain the communication session with the current serving base station 304. For example, it may be desirable for the coverage area of the serving base station 304 to be effectively extended, e.g., to a larger coverage area 324.

Therefore, one or more aspects of the present disclosure may improve the probability that the UE 100 may remain attached to its current serving base station 304, e.g., by effectively extending the service coverage area of the base station 304.

For example, one or more aspects of the disclosure may enable receive diversity prior to declaring the OOS state, such that the UE 100 may utilize two or more transceivers 110, 111 and/or two or more antennas 116, 118 to obtain further measurements of the radio channel corresponding to the current serving cell. In this way, by taking advantage of spatial diversity gains that result, an effective extension of the service coverage area for the current serving cell may be achieved. That is, by virtue of the UE 100 performing a second set of radio channel measurements with receive diversity, the probability of occurrence of an OOS state may be reduced, because the second measurement may exhibit suitable signal characteristics to maintain the ongoing connection with the current serving cell.

Figure 4:
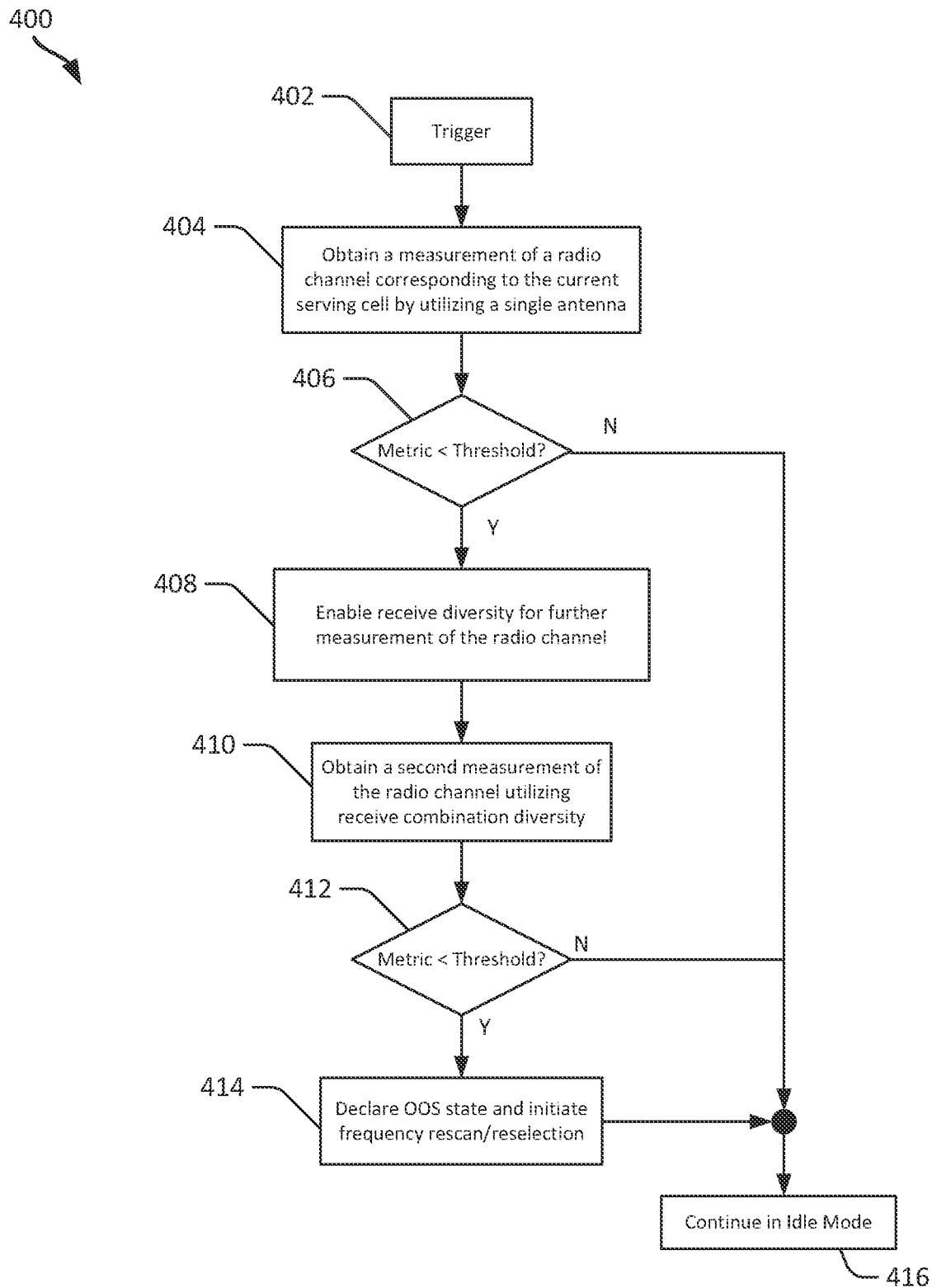
FIG. 4 is a flowchart illustrating a method of wireless communication according to at least one example.

FIG. 4 is a flow chart illustrating one example of a process 400 operable at a wireless user equipment (e.g., the UE 100) for performing measurements of a radio channel in accordance with one or more aspects of the present disclosure. In various examples, the process 400 may be operable at any suitable UE, including but not limited to the UE 100 illustrated in FIG. 1. In some examples, the process 400 may be operable at any processor, implemented by a computer-readable storage medium, and/or operable by any suitable means for performing the recited functions.

At step 402, any suitable measurement trigger may take place. As one example, the UE 100 may receive a page message, or a page indicator channel (PICH) that indicates that a message and/or call establishment request is available for the UE. Upon receiving the PICH, or upon any other suitable trigger event, the UE 100 may begin a radio channel measurement process as described herein below.

In one example, the UE 100 may periodically receive the PICH while in idle state, wherein an information element on the PICH is configured to indicate that a message and/or call establishment request is available for the UE 100. Upon receiving the PICH, the UE 100 may measure cell conditions to determine whether the current cell is suitable for providing continued service to the UE 100.

At step 404, the UE 100 may obtain a measurement of the radio channel, corresponding to the current serving cell (e.g., corresponding to base station 204 in FIG. 2). In one aspect of the disclosure, this first measurement at step 404 may be carried out by utilizing a single antenna (e.g., first antenna 116) of a plurality of antennas (e.g., antennas 116 and 118) at the UE 100. Furthermore, this first measurement at step 404 may be carried out by utilizing a single transceiver (e.g., first transceiver 110) of a plurality of transceivers (e.g., transceivers 110 and 111) at the UE 100.

In some examples, the measurement of the radio channel corresponding to the current serving cell obtained at step 404 may be a single instantaneous measurement, and in other examples, the measurement may be some combination of a plurality of measurements over time. For example, an average value of a plurality of measurements may be used; a maximum or minimum of a plurality of measurements may be used; or any other filtering or combination of a plurality of measurements may be used.

In various examples, the measurement of the radio channel corresponding to the current serving cell obtained at step 404 may correspond to any suitable measured value, including but not limited to a received signal code power (RSCP), a pilot power, a signal-to-noise ratio, a success or failure of a CRC, etc.

In an aspect of the present disclosure, it may be the case that the UE 100, moving in the direction of motion 208, may move toward the edge 214 of the conventional coverage area associated with its current serving base station 204, and accordingly, one or more characteristics of the radio channel corresponding to the current serving cell may deteriorate below a desired or needed level. In this case, in a conventional network, a UE may determine to declare the OOS state and to perform a frequency rescan and/or connect to a different base station, even if the different base station is not entirely suitable. However, in an aspect of the present disclosure, the UE 100 may be configured to delay declaring the OOS state and initiating a frequency rescan, by extending the effective coverage area through the use of diversity measurements.

That is, at step 406, the UE 100 may determine whether a metric of the radio channel corresponding to the measurement made at step 404 is less than a given threshold value. In various aspects of the disclosure, the metric of the radio channel may correspond to a single instantaneous measurement; a filtered and/or averaged measurement; or any other suitable calculation based on one or more measurements. Furthermore, the threshold may be a predetermined value, or in other examples, it may be reconfigured by the UE 100 in accordance with any suitable parameters, such as information received from the network.

If, at step 406, the metric is not less than the threshold, then the process may proceed to step 416, and the UE 100 may continue (e.g., in Idle mode operations) utilizing a single antenna. That is, in the instance that the measurements of the radio channel indicate that performance with a single antenna is satisfactory, then the UE 100 may continue utilizing the single antenna, and maintain communication with the current serving cell utilizing the single antenna.

However, in the case that the metric determined at steps 404 and 406 is less than the threshold, then the process may proceed to step 408, wherein the UE 100 may enable receive diversity for further measurement of the radio channel.

According to various aspects of the disclosure, receive diversity may be accomplished in any of at least two different ways. In a first example, utilizing switching or selection diversity, each individual antenna may be utilized, one at a time, to make measurements of the radio channel corresponding to the current serving cell. Subsequently, the measurements may be combined, e.g., by a processor 104 at the UE 100, in such a way as to achieve spatial diversity gains. This combination may be achieved by selecting the better signal from the two antennas, by summing their values, or by otherwise combining their values in any suitable fashion.

In another example, utilizing combination diversity, two or more antennas may be simultaneously utilized to make measurements of the radio channel corresponding to the current serving cell. Here, the plural measurements may be combined (e.g., by the processor 104) as they are made, or soon thereafter, in order to achieve spatial diversity gains. Combination of the plural measurements may be accomplished in some examples by determining a correlation between data bits received on the different antennas. In other examples, combination of the plural measurements may be accomplished by measuring the relevant quantity at each antenna, and generating a sum of the power from the respective antennas, without considering any correlation between the received signals.

Thus, at step 410, the UE 100 may, utilizing receive combination diversity, obtain a second measurement of the radio channel. Here, in some examples, the second measurement may measure the same quantity measured by the single antenna at step 404, described above; but in other examples, the second measurement may measure any other suitable quantity corresponding to the radio channel corresponding to the current serving cell.

For example, at step 410, the UE 100 may, utilizing receive combination diversity, utilize the measurement to determine any one or more of a number of physical properties or metrics of the radio channel. In one example, corresponding to a W-CDMA signal, the UE 100 may utilize the measurement to determine a cell selection receive level value (Srxlev), a cell selection quality value (Squal), or any other suitable value that may relate to cell selection. In another example, the UE 100 may utilize the measurement to determine a received signal code power (RSCP), a pilot power (Echo), or other metric corresponding to the received power from the cell. That is, in some examples, the measurement may be utilized to determine the total power received from transmissions from the current serving base station, e.g., without taking into account the information content of data bits received at the respective antennas.

In some aspects of the disclosure, the determination of the measured value or metric at step 410 may include an average or otherwise filtered calculation corresponding to a plurality of measurements utilizing the plural antennas. In other aspects of the disclosure, the determination of the measured value or metric at step 410 may include a certain piecewise combination of a plurality of measurements utilizing the plural antennas. Here, for the piecewise combination, the UE 100 may determine whether all individual measurements over the past N seconds are greater than a certain threshold. Here, if any one or more of the measurements are not greater than the threshold, the UE 100 may declare the OOS state.

In another aspect of the present disclosure, the determination of the measured value or metric at step 410 may be generated by utilizing the maximum measured channel characteristic from among two (or more) sequential measurements, rather than utilizing a filtered, averaged, or piecewise combination as described above. That is, the UE 100 may select the best measurement, and utilize that best value in the comparison the threshold at step 412, described below.

That is, at step 412, the UE 100 may determine whether the measured value or metric from step 410 is less than a given threshold value. In various aspects of the disclosure, the threshold may be a predetermined value, or in other examples, it may be reconfigured by the UE 100 in accordance with any suitable parameters, such as information received from the network. Further, in various examples, the threshold utilized at step 412 may be the same as, or different than, the threshold utilized at step 406, in accordance with design preferences. For example, if the diversity measurement made at step 410 measures the same radio channel characteristic as the single-antenna measurement made at step 404, then it may be desirable to utilize the same threshold at steps 412 and 406. In this way, the gains that may be achieved from the spatial diversity of the antennas at step 410 may be apparent.

If, at step 412, the measured value or metric from step 410 is less than the threshold, then the process may proceed to step 414, wherein the UE 100 may declare the OOS state, followed in some examples by initiating a frequency rescan and/or reselection.

However, if, at step 412, the measured value or metric from step 410 is not less than the threshold, then the process may proceed to step 416, wherein the UE 100 may continue (e.g., in Idle mode operations) communication with its current serving cell. In some examples, when a diversity measurement was needed for the measured value or metric to exceed the threshold, then at step 416, the UE 100 may utilize receive diversity for ongoing Idle mode communications, such as receiving and decoding incoming page messages and/or PICH messages.

In this way, by virtue of the use of a receive diversity measurement, and its corresponding gains in its measurement of characteristics of the current serving cell, the UE 100 effectively achieves an expansion of the service coverage area of the current serving base station, even in the case of the so-called "death grip" where a user's hand may block one or the other antenna at the UE 100. Accordingly, the UE 100 may reduce the probability of occurrence of the OOS state, and may maintain communication with its current serving cell rather than potentially reselecting to an inferior cell, or to a RAN or RAT that the UE 100 may not desire to use. Furthermore, a corresponding performance degradation and excessive power consumption that would result from the rescan and/or reselection can be avoided by enabling more reliable detection, measurement and decoding of data packets through the use of receiver diversity. Accordingly, coverage and call reception can be better assured.

Figure 5:
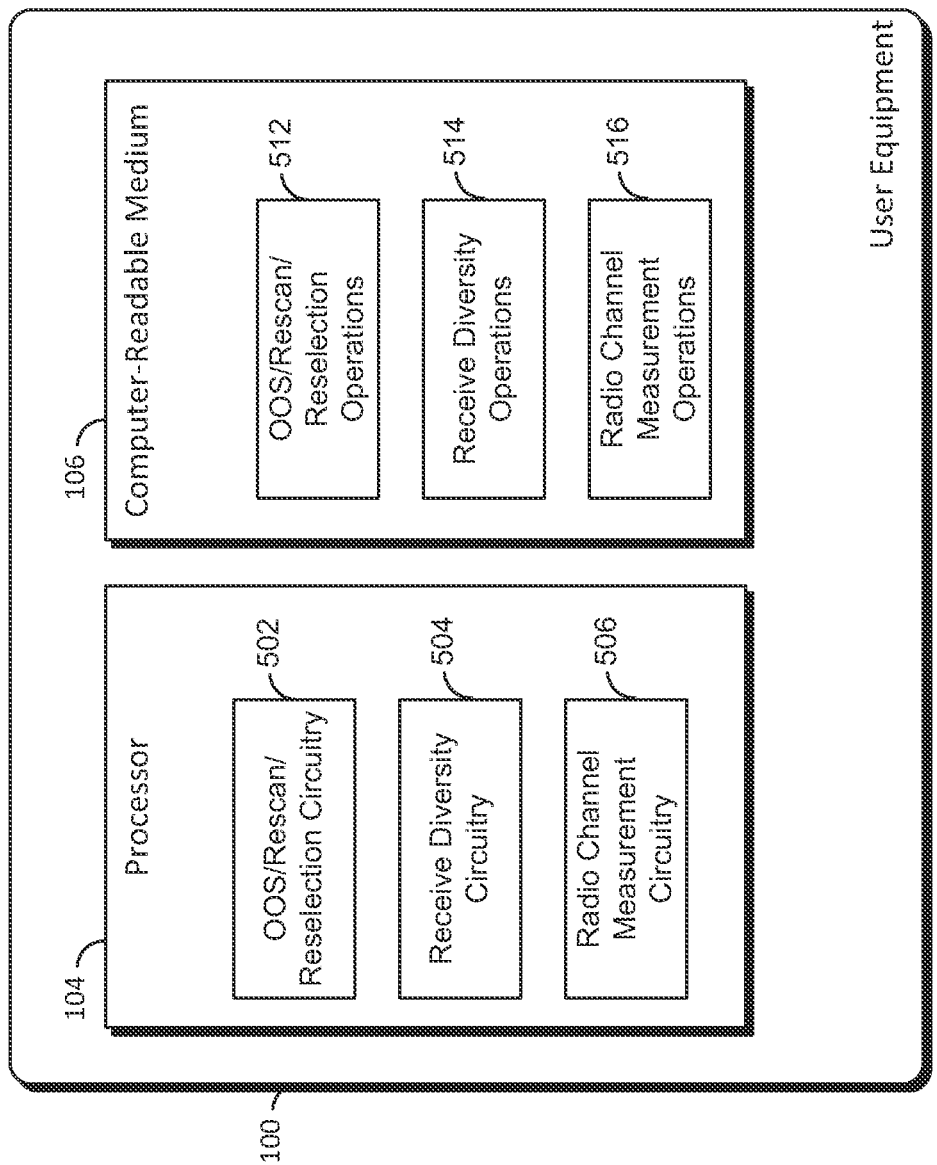
FIG. 5 is a simplified block diagram illustrating a hardware implementation of a UE according to at least one example.

FIG. 5 is a simplified block diagram illustrating some of the components of a UE 100 configured according to one or more aspects of the present disclosure. In various examples, the UE 100 may be configured to perform any one or more of the functions described above, and in particular, may implement part of the process illustrated in FIG. 4, described above. For example, the UE 100 may be a UE as illustrated in any one or more of FIGS. 1 2, and/or 3.

The UE 100 includes a processor 104 coupled to or placed in electrical communication with a computer-readable storage medium 106. The processor 104, as utilized in the UE 100, may be used to implement any one or more of the processes described below and illustrated in FIGS. 3 and/or 4, including but not limited to blocks 402, 406, and 412 in FIG. 4. The processor 104 may, in one or more examples, include out-of-service (OOS)/rescan/reselection circuitry 502 configured for various functions, including, for example, determination whether the UE 100 declares an OOS state, and in response, initiating a frequency rescan and/or reselection to, for example, a neighboring RAN. For example, the OOS/rescan/reselection circuitry 502 may be configured to implement one or more of the functions described above in relation to FIG. 4, including, e.g., block 414.

Further, the UE 100 includes receive diversity circuitry 504, for enabling, disabling, and/or configuring a receive diversity mode for the UE 100. For example, the receive diversity circuitry 504 may be configured to enable/disable a selection diversity mode and/or a combination diversity mode. For example, the receive diversity circuitry 504 may be configured to implement one or more of the functions described above in relation to FIG. 4, including, e.g., block 408. The UE 100 may further include radio channel measurement circuitry 506, for carrying out a measurement of one or more characteristics of a radio channel, as well as for determining one or metrics in accordance with the measured characteristics. For example, the radio channel measurement circuitry 506 may be configured to implement one or more of the functions described above in relation to FIG. 4, including, e.g., blocks 404 and 410.

The computer-readable storage medium 106 may be configured to operate in tandem with the processor 104 for carrying out the above-described functions. In one or more examples, the computer-readable storage medium 106 may include out-of-service (OOS)/rescan/reselection operations 512 configured for various functions, including, for example, determination whether the UE 100 declares an OOS state, and in response, initiating a frequency rescan and/or reselection to, for example, a neighboring RAN. For example, the OOS/rescan/reselection operations 512 may be configured to implement one or more of the functions described above in relation to FIG. 4, including, e.g., block 414.

Further, the UE 100 includes receive diversity operations 514, for enabling, disabling, and/or configuring a receive diversity mode for the UE 100. For example, the receive diversity operations 514 may be configured to enable a selection diversity mode or a combination diversity mode. For example, the receive diversity operations 514 may be configured to implement one or more of the functions described above in relation to FIG. 4, including, e.g., block 408. The UE 100 may further include radio channel measurement operations 516, for carrying out a measurement of one or more characteristics of a radio channel, as well as for determining one or metrics in accordance with the measured characteristics. For example, the radio channel measurement operations 516 may be configured to implement one or more of the functions described above in relation to FIG. 4, including, e.g., blocks 404 and 410.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-5 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-5 may be configured to perform one or more of the methods, features, or steps described herein. The novel algorithms described herein may also be efficiently implemented in software and/or embedded in hardware.

In one configuration, the UE 100 for wireless communication includes means for obtaining measurements of a radio channel, e.g., the radio channel corresponding to a current serving cell. In one aspect, the aforementioned means may be the processor(s) 104 and/or the radio channel measurement circuitry 506 configured to perform the functions recited by the aforementioned means. In another aspect, the aforementioned means may be a circuit or any apparatus configured to perform the functions recited by the aforementioned means.

In one configuration, the UE 100 for wireless communication includes means for enabling and disabling receive diversity utilizing any two or more suitable antennas, and means for utilizing receive diversity while maintaining communication with the current serving cell. In one aspect, the aforementioned means may be the processor(s) 104 and/or the receive diversity circuitry 504 configured to perform the functions recited by the aforementioned means. In another aspect, the aforementioned means may be a circuit or any apparatus configured to perform the functions recited by the aforementioned means.

In one configuration, the UE 100 for wireless communication includes means for declaring an out of service (OOS) state and for initiating a frequency rescan. In one aspect, the aforementioned means may be the processor(s) 104 and/or the OOS/rescan/reselection circuitry 502 configured to perform the functions recited by the aforementioned means. In another aspect, the aforementioned means may be a circuit or any apparatus configured to perform the functions recited by the aforementioned means.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a user equipment (UE), comprising:
    obtaining a first measurement of a radio channel corresponding to a current serving cell, by utilizing a first antenna;
    enabling receive diversity utilizing the first antenna and a second antenna to obtain a second measurement of the radio channel when a metric of the radio channel corresponding to the first measurement is less than a predetermined threshold value; and
    maintaining communication with the current serving cell while continuing to utilize the receive diversity if a second metric of the radio channel corresponding to the second measurement is not less than a second threshold,
    wherein enabling receive diversity reduces a probability of occurrence of an out-of-service state based on the second measurement.

2. The method of claim 1, wherein enabling receive diversity comprises enabling combination diversity wherein the first antenna and the second antenna are spatially separated from each other, and are simultaneously utilized to measure the radio channel corresponding to the current serving cell.

3. The method of claim 1, further comprising determining the second metric of the radio channel,
    wherein the determining the second metric comprises obtaining a plurality of measurements of the radio channel over time, and determining whether a predetermined number of the plurality of measurements over a predetermined period are not less than the second threshold.

4. The method of claim 1, further comprising:
    determining the second metric of the radio channel; and
    declaring an out of service state and initiating a frequency rescan if none of a plurality of measurements of the radio channel, over time, utilizing the receive diversity, are greater than the second threshold.

5. The method of claim 1, wherein the second measurement comprises a total received signal strength of transmissions from the current serving cell.

6. The method of claim 5, wherein the total received signal strength corresponds to a received signal code power (RSCP).

7. A user equipment (UE) configured for wireless communication, comprising:
    means for obtaining a first measurement of a radio channel corresponding to a current serving cell, by utilizing a first antenna;
    means for enabling receive diversity utilizing the first antenna and a second antenna to obtain a second measurement of the radio channel when a metric of the radio channel corresponding to the first measurement is less than a predetermined threshold value; and
    means for maintaining communication with the current serving cell while continuing to utilize the receive diversity if a second metric of the radio channel corresponding to the second measurement is not less than a second threshold,
    wherein the means for enabling receive diversity is configured to reduce a probability of occurrence of an out-of-service state based on the second measurement.

8. The UE of claim 7, wherein the means for enabling receive diversity is further configured to enable combination diversity wherein the first antenna and the second antenna are spatially separated from each other, and are simultaneously utilized to measure the radio channel corresponding to the current serving cell.

9. The UE of claim 7, further comprising means for determining the second metric of the radio channel,
    wherein the means for determining the second metric is further configured for obtaining a plurality of measurements of the radio channel over time, and for determining whether a predetermined number of the plurality of measurements over a predetermined period are not less than the second threshold.

10. The UE of claim 7, further comprising:
    means for determining the second metric of the radio channel; and
    means for declaring an out of service state and initiating a frequency rescan if none of a plurality of measurements of the radio channel, over time, utilizing the receive diversity, are greater than the second threshold.

11. A user equipment (UE) configured for wireless communication, comprising:
    at least one processor;
    a memory coupled to the at least one processor;
    a first antenna and a second antenna; and
    at least one transceiver coupled to the first antenna and the second antenna, and coupled to the at least one processor, wherein the at least one processor is configured to:
obtain a first measurement of a radio channel corresponding to a current serving cell, by utilizing the first antenna;
enable receive diversity utilizing the first antenna and the second antenna to obtain a second measurement of the radio channel when a metric of the radio channel corresponding to the first measurement is less than a predetermined threshold value; and
maintain communication with the current serving cell while continuing to utilize the receive diversity if a second metric of the radio channel corresponding to the second measurement is not less than a second threshold,
wherein enabling receive diversity reduces a probability of occurrence of an out-of-service state based on the second measurement.

12. The UE of claim 11, wherein the at least one processor, being configured to enable receive diversity, is further configured to enable combination diversity wherein the first antenna and the second antenna are spatially separated from each other, and are simultaneously utilized to measure the radio channel corresponding to the current serving cell.

13. The UE of claim 11, wherein the at least one processor is further configured to determine the second metric of the radio channel, and
wherein the at least one processor, being configured to determine the second metric, is further configured to obtain a plurality of measurements of the radio channel over time, and to determine whether a predetermined number of the plurality of measurements over a predetermined period are not less than the second threshold.

14. The UE of claim 11, wherein the at least one processor is further configured to:
determine the second metric of the radio channel; and
declare an out of service state and initiate a frequency rescan if none of a plurality of measurements of the radio channel, over time, utilizing the receive diversity, are greater than the second threshold.

15. The UE of claim 11, wherein the second measurement comprises a total received signal strength of transmissions from the current serving cell.

16. The UE of claim 15, wherein the total received signal strength corresponds to a received signal code power (RSCP).

17. A non-transitory computer-readable storage medium comprising instructions that, when executed by a computer, cause the computer to:
obtain a first measurement of a radio channel corresponding to a current serving cell, by utilizing a first antenna;
enable receive diversity utilizing the first antenna and a second antenna to obtain a second measurement of the radio channel when a metric of the radio channel corresponding to the first measurement is less than a predetermined threshold value; and
maintain communication with the current serving cell while continuing to utilize the receive diversity if a second metric of the radio channel corresponding to the second measurement is not less than a second threshold,
wherein enabling receive diversity reduces a probability of occurrence of an out-of-service state based on the second measurement.

18. The computer-readable storage medium of claim 17, further comprising instructions that, when executed by a computer, cause the computer to enable combination diversity wherein the first antenna and the second antenna are spatially separated from each other, and are simultaneously utilized to measure the radio channel corresponding to the current serving cell.

19. The computer-readable storage medium of claim 17, further comprising instructions that, when executed by a computer, cause the computer to determine the second metric of the radio channel, and
wherein the instructions that, when executed by a computer, cause the computer to determine the second metric, further cause the computer to obtain a plurality of measurements of the radio channel over time, and to determine whether a predetermined number of the plurality of measurements over a predetermined period are not less than the second threshold.

20. The computer-readable storage medium of claim 17, further comprising instructions that, when executed by a computer, cause the computer to:
determine the second metric of the radio channel; and
declare an out of service state and initiate a frequency rescan if none of a plurality of measurements of the radio channel, over time, utilizing the receive diversity, are greater than the second threshold.

21. The computer-readable storage medium of claim 17, wherein the second measurement comprises a total received signal strength of transmissions from the current serving cell.

22. The computer-readable storage medium of claim 21, wherein the total received signal strength corresponds to a received signal code power (RSCP).

* * * * *